(12) United States Patent
Yokote et al.

(10) Patent No.: US 9,311,156 B2
(45) Date of Patent: Apr. 12, 2016

(54) SYSTEM AND METHOD FOR DISTRIBUTING DATA PROCESSES AMONG RESOURCES

(75) Inventors: Yasuhiko Yokote, Tokyo (JP); Hirotoshi Maegawa, Tokyo (JP); Noriyuki Murata, Tokyo (JP)

(73) Assignees: SONY CORPORATION, Tokyo (JP); SONY COMPUTER ENTERTAINMENT, INC., Tokyo (JP)

( * ) Notice: Subject to any disclaimer, the term of this patent is extended or adjusted under 35 U.S.C. 154(b) by 1943 days.

(21) Appl. No.: 12/089,315

(22) PCT Filed: Jan. 15, 2007

(86) PCT No.: PCT/JP2007/050412
§ 371 (c)(1),
(2), (4) Date: May 29, 2008

(87) PCT Pub. No.: WO2007/081002
PCT Pub. Date: Jul. 19, 2007

(65) Prior Publication Data
US 2010/0131740 A1   May 27, 2010

(30) Foreign Application Priority Data
Jan. 16, 2006   (JP) .................................. 2006-008064

(51) Int. Cl.
*G06F 9/50*   (2006.01)

(52) U.S. Cl.
CPC ..................................... *G06F 9/5066* (2013.01)

(58) Field of Classification Search
CPC ................................. G06F 9/5083; G06F 9/52
USPC .......................................... 718/102; 120/102
See application file for complete search history.

(56) References Cited

U.S. PATENT DOCUMENTS

| 6,775,831 | B1 * | 8/2004 | Carrasco et al. ............... 718/100 |
| 2003/0018661 | A1 * | 1/2003 | Darugar ........................ 707/500 |
| 2003/0226007 | A1 * | 12/2003 | Olson et al. .................... 713/150 |
| 2005/0188087 | A1 | 8/2005 | Iyoda |
| 2005/0193085 | A1 * | 9/2005 | Shimizu ........................ 709/216 |

FOREIGN PATENT DOCUMENTS

| JP | 09218861 | 8/1997 |
| JP | 2005242598 | 9/2005 |

(Continued)

OTHER PUBLICATIONS

International Search Report dated Mar. 6, 2007 from corresponding PCT/JP2007/050412.

(Continued)

*Primary Examiner* — Jacob A Petranek
(74) *Attorney, Agent, or Firm* — Katten Muchin Rosenman LLP

(57) ABSTRACT

The workload is heavy in the development of an application program that controls the task distribution in consideration of the variety of the execution environment. In a system where the processing is distributed to SPUs serving as plural processing entities so as to execute the computer program, the data processing is broken into plural units of processing by referring to the script code in which the content of the data processing is written, and the units of processing are assigned to the plural SPUs. Then, the whole computer program is executed when the SPUs execute the assigned process.

6 Claims, 12 Drawing Sheets

(56) References Cited

FOREIGN PATENT DOCUMENTS

| JP | 2005339137 | 12/2005 |
|---|---|---|
| WO | 2004/086270 | 10/2004 |

OTHER PUBLICATIONS

International Preliminary Report on Patentability and Written Opinion of the International Searching Authority dated Jul. 22, 2008, from the corresponding International Application.
Chinese Office Action dated Jun. 24, 2010, from the corresponding Chinese Application.
Notification of Reason(s) for Refusal dated Mar. 24, 2009, from the corresponding Japanese Application.
Daichi Goto "FreeBSD de Java Thread" FreeBSD Press, Mainichi Communications, Domestic Technical Magazine 2004-00541-002, Jun. 18, 2003, No. 17, pp. 45-50.
Allan Vermeulen "Mechanism of Creation of Deadlocks in Java" DDJ, Shoeisha, Domestic Technical Magazine 1998-01765-013, Feb. 1, 1998, vol. 7, No. 2, pp. 126-131.
Jonathan Locke "Change in the order of priority threads is prohibited. Synchronization is recommended" Microsoft Interactive Developer, Domestic Technical Magazine 2000-00307-020, Ascii, Jan. 18, 1999, No. 11, pp. 157-161.
Supplementary European Search Report dated Aug. 26, 2011, from corresponding European Application No. 07 70 6746.
Kento Aida, et al. "Distributed Computing with Hierarchical Master-worker Paradigm for Parallel Branch and Bound Algorithm" Cluster Computing and the Grid, May 12, 2003.
Sergio Briguglio, et al. "Workload Decomposition for Particle Simulation Applications on Hierarchical Distributed-Shared Memory Parallel Systems with Integration of HPF and OpenMP" Conference Proceedings of the 2001 International Conference on Supercomputing, Jun. 17, 2001.

* cited by examiner

FIG.7

```
class MyModule1: SpuModule {

//IDENTIFIER IDENTIFYING INTERFACE FOR EXTERNAL UNIT
PUBLIC
  void method1(int x, int y) {
    //CONTENT
  }

//IDENTIFIER IDENTIFYING INTERFACE FOR INTERNAL UNIT
PROTECTED
  void method2(string s) {

//EXAMPLE OF CALLING ANOTHER MODULE
    //ACQUIRE Proxy
    MyModule2Proxy m2proxy = getModuleProxy( "MyModule2" );  //FUNCTION OFFERED BY SpuModule //ASYNCHRONOUS CALL
    m2proxy.asyncmethod( "test" );

//SYNCHRONOUS CALL
    String str = m2proxy.syncmethod( "hello" );

//CALL FOR DELAY EVALUATION  delayed IS A TEMPLATE USED FOR RETURN VALUE IN DELAY EVALUATION
    delayed<String> dstr = m2proxy.delayedmethod( "world" );
    dstr.wait();  //WAITING FOR PROCESS COMPLETION
    str = getValue(dstr);  //ACQUIRE ACTUAL VALUE (BLOCKED DURING THE EXECUTION)
  }
}
```

FIG.8

```
void method3(string s) {

//EXAMPLE OF CALLING ANOTHER PROGRAM
    //ACQUIRE Proxy
    MyProgramProxy prgproxy = getProgramProxy( "MyProgram" );// FUNCTION OFFERED BY SpuModule //ASYNCHRONOUS CALL
    prgproxy.asyncmethod( "test" );

//CALL BY USE OF XML SCRIPT
    String xmlScript = "Script A"
    executeScript(xmlScript);
}
```

FIG.9

```
<CellScript xmlns= "cell.org" >
    <concurrent>
        <execute program= "MyProgram" method= "method1" >
            <arg1>argument1</arg1>
            <arg2>argument2</arg2>
        </execute>
        <execute program= "MyProgram" method= "method2" />
        <sequence>
            <execute program= "MyProgram" method= "method3" />
            <execute program= "MYProgram" method= "method4" />
        </sequence>
        <pipe>
            <input>DATA TO BE INPUT INTO PIPE</input>
            <execute program= "MyProgram1" method= "proc1" />
            <execute program= "MyProgram2" method= "prog2" />
        </pipe>
    </concurrent>
</CellScript>
```

FIG.10

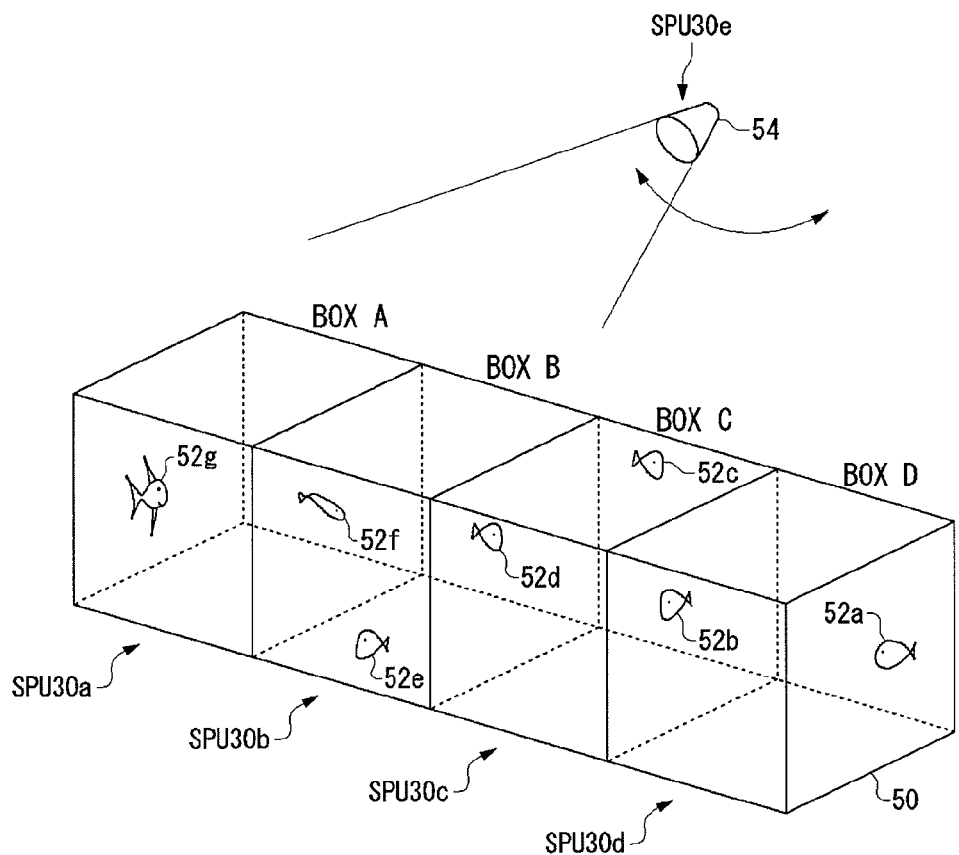

FIG.12A

```
<CellScript xmlns= "cell.org" >
  <Sequence>
    <!--INITIAL ARRANGEMENT-->                                              A
    <Concurrent>
      <execute program= "GroupSimulation" id= "1"  method= "initialize" >
        <!--DESIGNATE ID OF PROGRAM WHICH PROCESSES ADJACENT BLOCK-->
        <neighbor>
         <List>
           <string value= "2" />
           <string value= "3" />
           <string value= "4" />
           <!--DESIGNATE NECESSARY NUMBER IN THE FOLLOWING-->
         </List>
        </neighbor>
        <!--DESIGNATE AREA IN CHARGE-->
        <range></range>
        <!--DESIGNATE LOCATION OF FISH-->
        <objects>
          <position x= "1.1" y= "1.2" z= "1.3" />
          <position x= "1.1" y= "2.2" z= "2.3" />
          <position x= "1.1" y= "3.2" z= "4.3" />
          <!--...-->
        </objects>
      </execute>                                                           Aa
      <execute program= "GroupSimulation" id= "2"  method= "initialize" >
        <!--...-->
      </execute>                                                           Ab
      <!--WRITE AS NECESSARY IN THE FOLLOWING-->                         Ac, Ad
```

FIG.12B

```
//MODULE FOR MOVING LIGHT SOURCE
<execute program= "GroupSimulation" method= "init_light" >
 <simulator>
  <List>
   <string value= "2" />
   <string value= "3" />
   <string value= "4" />
   <!--DESIGNATE NECESSARY NUMBER IN THE FOLLOWING-->
  </List>
 </simulator>
 <position x= "5" y= "3" z= "2" />
</execute>
```
AI `</Concurrent>`

```
<!--EXECUTE STEP BY STEP-->
  <Loop count= "10000" >
```
B

```
    <!--MOVE LIGHT SOURCE-->
    <execute program= "GroupSimulation" method= "move light" />
```
BI

```
    <!--PARALLEL PROCESSING OF EACH BLOCK-->
    <Concurrent>
     <execute program= "GroupSimulation" id= "1" method= "simulate" />
     <execute program= "GroupSimulation" id= "2" method= "simulate" />
     <execute program= "GroupSimulation" id= "3" method= "simulate" />
     <!--WRITE AS NECESSARY IN THE FOLLOWING-->
    </Concurrent>
```
Ba~Bd

```
    <!--LOOP AFTER WHOLE LOCK IS EXECUTED-->
  </Loop>
</Sequence>
</CellScript>
```

SYSTEM AND METHOD FOR DISTRIBUTING DATA PROCESSES AMONG RESOURCES

TECHNICAL FIELD

The present invention relates to a technique that distributes a process to plural computation resources so as to execute a computer program.

BACKGROUND ART

Rich function and performance of software including computer games or web search software puts a heavy processing load on hardware. To address such circumstances, it is necessary to speed up those processing, and it is also important to distribute tasks to plural processors in a suitable manner.

DISCLOSURE OF THE INVENTION

Problems to be Solved by the Invention

In distributing tasks as described above, however, there are various computation resources available to the whole system. To develop an application program that controls the task distribution in consideration of the variety of the execution environment will be a heavy burden, as compared to the development of the application program to be operated on a single processor.

The present invention has been made in view of the above circumstances, and has a general purpose of providing a technique for readily producing a computer program whereby processing is distributed to various computation resources over a network.

Means for Solving the Problems

An aspect of the present invention relates to a data processing system, whereby processing is distributed to plural control units coupled to each other via a communication line so as to execute a computer program.

In the above system, the data processing is broken into plural units of processing by referring to the script code in which the content of the data processing is written, and the units of processing are respectively assigned to the plural control units.

The control unit includes: a main controller which controls the control units in an integrated fashion; and plural sub-controllers which respectively execute the units of processing assigned by the main controller.

The main controller assigns a part of the unit of processing to a sub-controller, and the sub-controller executes the process assigned.

The process of breaking the data processing into the units of processing by referring to the script code and further assigning the units of processing may be executed by any of the control units. Alternatively, an apparatus for executing the above process may be provided separately. The script code may be written as a structured document file by use of tags in an XML format, or may be written in a script language such as Perl or JavaScript (Java is a registered trademark).

The communication line may be a communication network such as the Internet or a LAN, but may be a path for sending and receiving data such as a bus connecting plural control units.

Another aspect of the present invention relates to a data processing system, whereby processing is distributed to plural processing entities to execute the computer program.

In the above system, the data processing is broken into plural units of processing by referring to the script code in which the content of the data processing is written, and the units of processing are respectively assigned to the plural processing entities. Then, the processing entities execute the units of processing assigned, respectively.

In the above system, the plural processing entities may be processors included in one MPU. The units of processing extracted from the script code may be assigned respectively to the plural processing entities in a single MPU. Alternatively, the unit of processing may be further distributed to plural processing entities respectively included in the plural MPUs.

Implementations of the present invention in the form of methods, systems, storage media, computer programs, etc. may also be effective as aspects of the present invention.

Advantageous Effects

According to the present invention, the workload in producing a computer program for a distributed processing system where various computation resources are utilized over a network can be reduced.

BRIEF DESCRIPTION OF THE DRAWINGS

FIG. 7 shows an example of an element program;

FIG. 8 shows the element program continued from FIG. 7;

FIG. 9 shows the interface code;

FIG. 10 schematically shows how the movement of fish is simulated by computer graphics;

FIG. 12A shows an example of a program used by the present simulation; and

FIG. 12B shows the program continued from FIG. 12B.

EXPLANATION OF REFERENCES

10 resource management system, 12 LAN, 14 Internet, 16 user terminal, 18 local server, 20 network server, 22 MPU, 24 PU, 26 processor, 28 local memory, 30 SPU, 32 processor, 34 local memory, 36 internal bus, 38 main bus, 40 GPU, 42 main memory, 44 HDD, 46 network controller, 50 aquarium, 52 fish, 54 light source Best Mode For Carrying Out The Invention According to the present embodiment, not only a processor on a single computer but also processors on other computers coupled to the single computer are used. To this end, the scheme is configured such that hardware resources of the computers are managed on the network and the assignment of the distributed processing and the data exchange are controlled.

Figure 1:
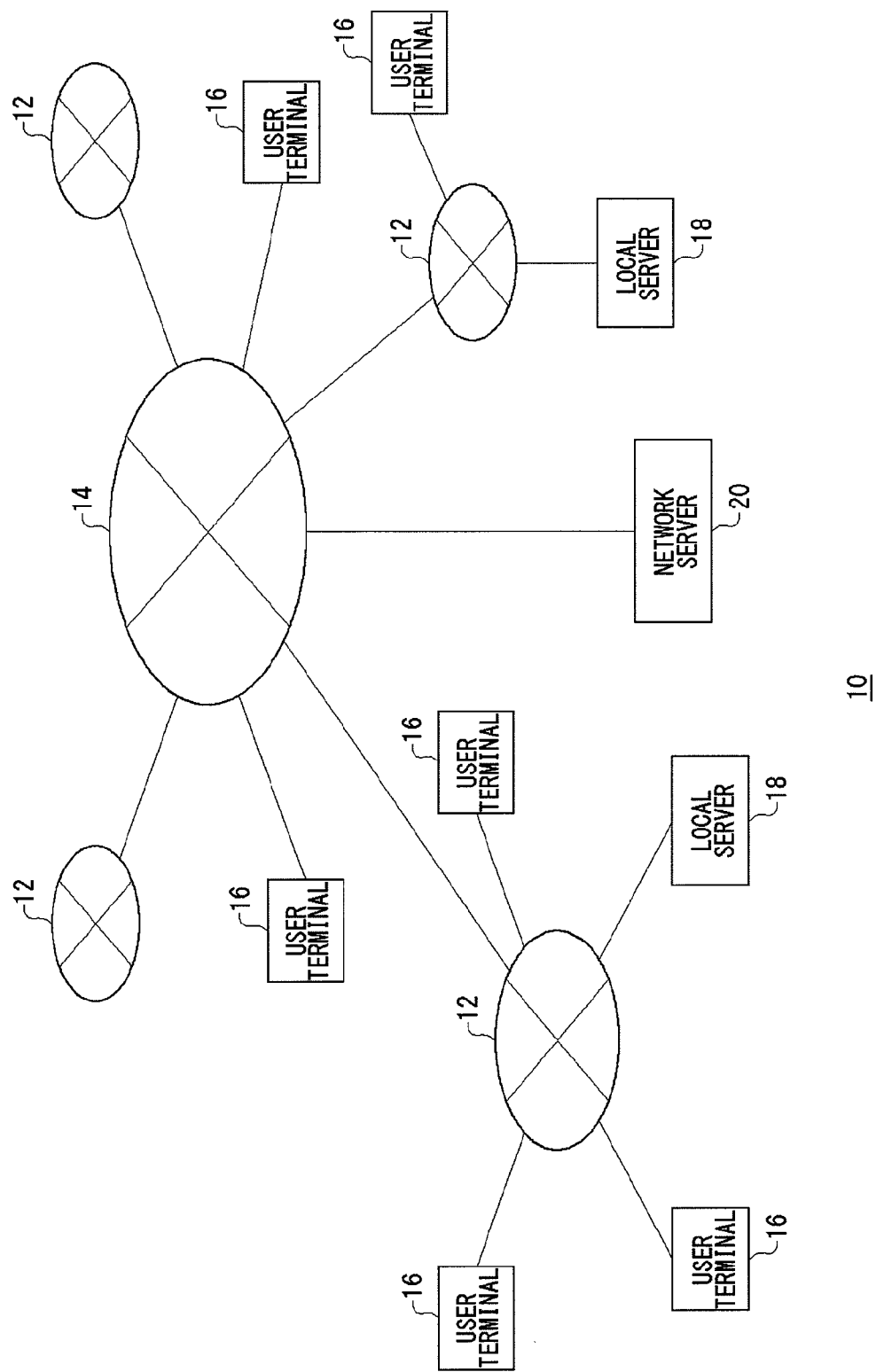
FIG. 1 schematically shows a system configuration of a resource management system.

FIG. 1 schematically shows a system configuration of a resource management system 10.

The resource management system 10 is composed of: an Internet 14; LANs 12; computers such as user terminals 16, etc. Each of the user terminals 16 is directly connected to the Internet 14 in some cases, and is connected to the Internet 14 via the LAN 12 such as a home network or intranet in the other cases. A network server 20 that manages and controls the use and provision of resources of the user terminals 16 is connected to the Internet 14. The LAN 12 may be connected to a local server 18 such as a home server that manages and controls the use and provision of resources of the user terminal 16 connected to the LAN 12. Each of the user terminals 16 may utilize a resource in the LAN 12, and the user terminals 16 may utilize the resources thereof with each other via the Internet 14. Also, the user terminal 16 may utilize the resource of the local server 18. In this manner, hardware resources are broadly shared by plural user terminals 16 or the local server 18 via the Internet 14 and the LAN 12, and are complementarily used for distributed processing, thereby enhancing the throughput more than when executing the process independently.

One of the user terminals 16 may be provided with a single Micro Processing Unit (MPU), and another user terminal 16 may be provided with two MPUs. Also, the local server 18 may be provided with four MPUs. In the resource management system 10 according to the present invention, the MPUs respectively included in different computers serve as control units, and respectively perform a small portion of the whole data processing.

Figure 2:
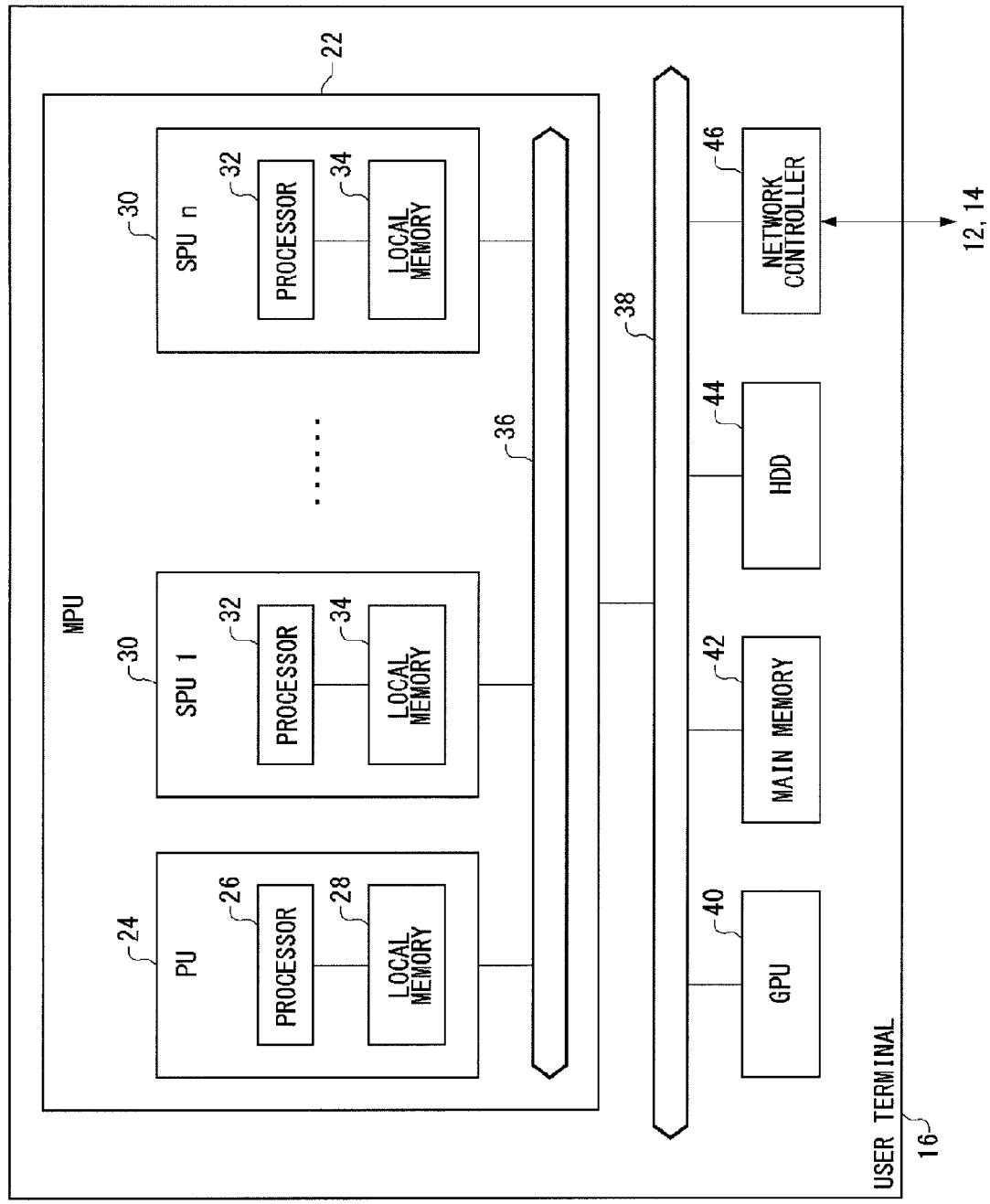
FIG. 2 illustrates a hardware configuration of a user terminal.

FIG. 2 illustrates a hardware configuration of the user terminal 16.

The user terminal 16 is provided with: a Micro Processing Unit (MPU) 22; a Graphics Processing Unit (GPU) 40; a main memory 42; an auxiliary storage (HDD) 44; and a network controller 46, each being connected via a main bus 38. The network controller 46 sends and receives data between another user terminal 16 via the LAN 12 or the Internet 14.

The MPU 22 is an asymmetric multiprocessor unit, and includes a single main processing unit (PU) 24 and plural sub-processing units (SPUs) 30, each being connected via an internal bus 36 of the MPU 22. The PU 24, serving as a main controller, is a unit for controlling the OS or each of the SPUs 30, and includes a processor 26 and a local memory 28. An example of the local memory 28 is a cache memory. Each SPU 30, serving as a sub-controller, is a unit for performing the multiply and accumulation, and includes a processor 32 and a local memory 34. A program or data read out from the main memory 42 is written into the local memory 34, and is then executed by the processor 32. The SPU 30 operates a process such as image processing or data conversion processing under the control of the PU 24. The PU 24 manages which SPU 30 performs which process, the content thereof, and an expected execution time thereof.

The functions of the OS are mainly performed by the PU 24; however, the functions are partially assigned to the SPUs 30, respectively. For example, very basic functions such as memory access, interruption, and interprocess communication are implemented on the respective SPUs 30. In the present embodiment, the PU 24 mainly controls the assignment of the process to the SPU 30, whereas the SPU 30 serves as a processing entity executing a program. When the OS runs on the MPU 22, the SPU 30 initiates an execution thread and waits for the assignment of the process from the PU 24. When receiving an instruction of performing a given process from the PU 24, the SPU 30 loads a necessary program (hereinafter, referred to as "element program") from the main memory 42 or the like into the local memory 34 and starts the process.

As an example, it is assumed to simulate walking of a robot A and a robot B. The PU 24 instructs a SPU 30*a* in a wait state to initiate the walking process of the robot A. The element program executed for the robot's walking process is installed in the main memory 42 in an executable format. The SPU 30*a* loads the above element program into the local memory 34 and starts the process. Meanwhile, the PU 24 instructs another SPU 30*b* to initiate the walking process of the Robot B. Likewise, the SPU 30*b* loads a given element program into the local memory 34 and starts the process. In this process, if the element program to be executed by the SPU 30*a* and that to be executed by the SPU 30*b* are concurrently executable, the element programs will be concurrently executed by the SPUs 30, respectively. If the element program is produced to cause the robot to walk only for three minutes, the SPU 30 will terminate the execution of the element program in three minutes and then enters the wait state again. This allows the PU 24 to newly assign another process to the SPU 30. The PU 24, to be precise, the OS performed by the PU 24 monitors the execution state of each of the SPUs 30 under the control thereof. In this manner, the SPUs 30, namely, plural computation resources in the MPU 22 appropriately perform the processes assigned by the PU 24.

Figure 3:
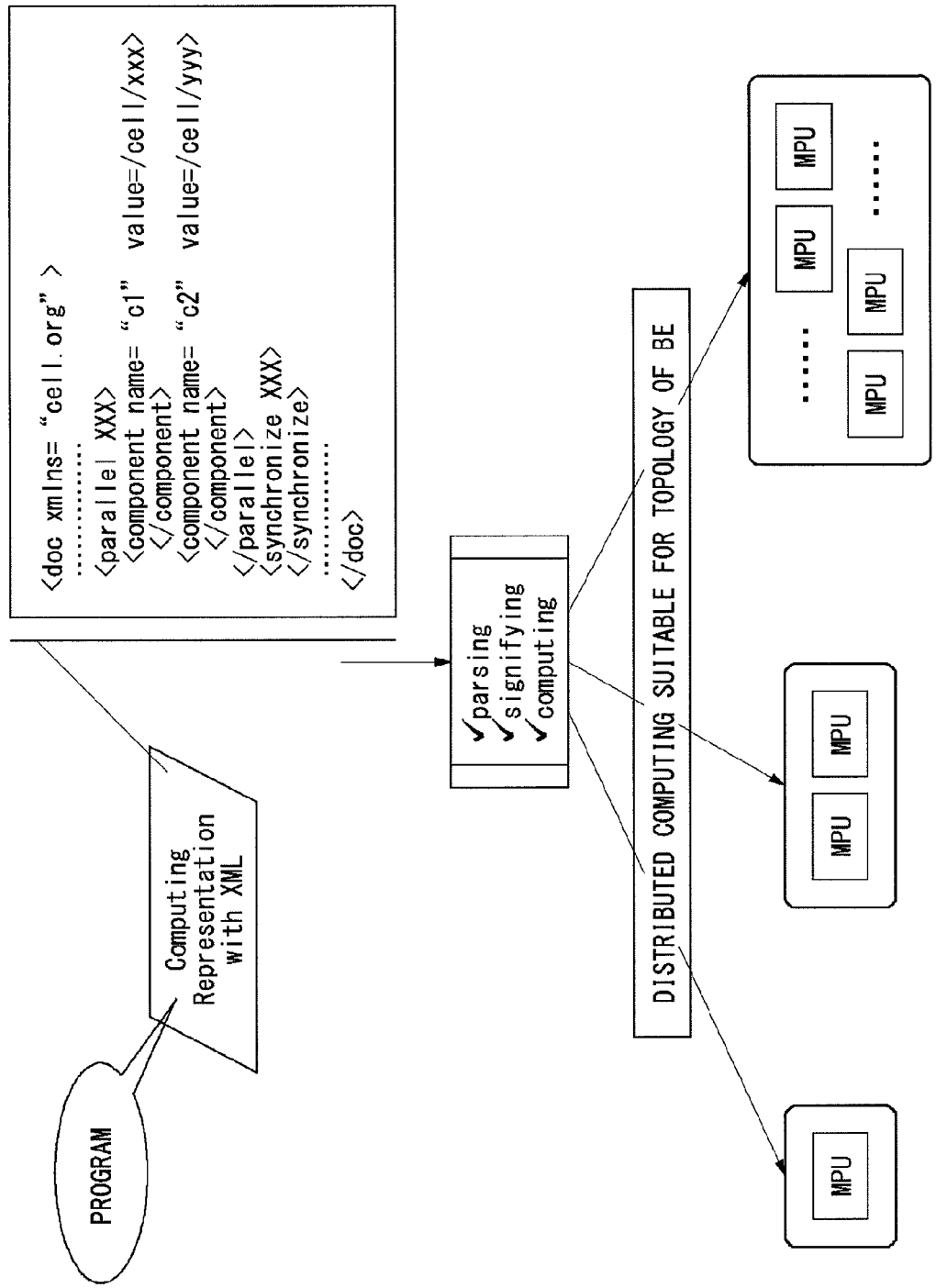
FIG. 3 schematically shows a method of executing an application program in the resource management system.

FIG. 3 schematically shows a method of executing an application program in the resource management system 10.

In the present embodiment, the content of the process to be executed in the resource management system 10 is written in an XML file. Hereinafter, the description indicating the execution content of the application program is referred to as "application code". The application code may be written in a given XML tag set, or may be written in another script language.

In the figure, the process of "component" named "c1" and the process of "component" named "c2" are written to be performed in parallel at the same time. The tag named <parallel> means that the processes each being defined as an element of the tag can be executed in parallel simultaneously. In the same manner, it is predefined what process content the tag named <component> means. <component> may be "a process for causing a human-like character to walk", or may be merely "an audio output process". In the process of writing the application codes, the entire processing can be written by combinations of basic processes associated with the tags. In addition, the processing method can be written like <parallel> tag. Further, the number of the MPUs 22 or that of the SPUs 30 necessary for each process may be designated.

A given user terminal 16 is installed with a program for interpreting the above application codes as an interpreter (hereinafter, referred to as "main program"). The MPU 22 of such user terminal 16 executes the main program, interprets the application code given, and divides the process written in the application code into plural processes. For instance, the application code shown in FIG. 3 includes two processes, "component" named "c1" and "component" named "c2".

The two types of processes can be executed in parallel. The main program assigns the processes to the MPU 22 of the user terminal 16*a* and to the MPU 22 of the user terminal 16*b*, respectively. The MPU 22 to which the process has been assigned acquires a program showing the detailed process of "component". Such program may be already installed in the HDD 44 of each user terminal 16, or may be downloaded from a given server apparatus via the Internet 14. Then, the MPU 22 to which the process has been assigned by the main program learns the detailed content of the assigned process. Hereinafter, the program executed by the MPU 22 is referred to as "unit program".

The MPU 22 checks thus acquired unit program for performing the process of "component" to determine whether the program can be further divided. For instance, when the unit program is a multithreaded program, the PU 24 may assign the process of each thread to the SPU 30. The SPU 30 acquires the element program for performing the process assigned, and performs the assigned process in accordance with the instruction given by the PU 24. For example, when the process "component" means "walking process of robot", this process may be further divided into smaller units of processing, such as "a process of calculating the walking path of the robot" or "a process of calculating the movement of the robot's hand". The PU 24 assigns so segmented processes to the SPUs 30. The PU 24 may assign a part of the process in the unit program not only to the SPU 30 under the control thereof but also to the PU 24 of another MPU 22.

In this manner, the process content written in the original application code is successively segmented. The processing entity thereof is also divided into plural MPUs 22, and is further divided into plural SPUs 30.

The process named "component" defined in the application code may not necessarily correspond to the unit program. For example, the process of "component" defined in the application code may correspond to the element program to be executed on the SPU 30. As described heretofore, the process code may be written as a combination of processes each having a size (granularity) that can be executed by the SPU 30.

Figure 4:
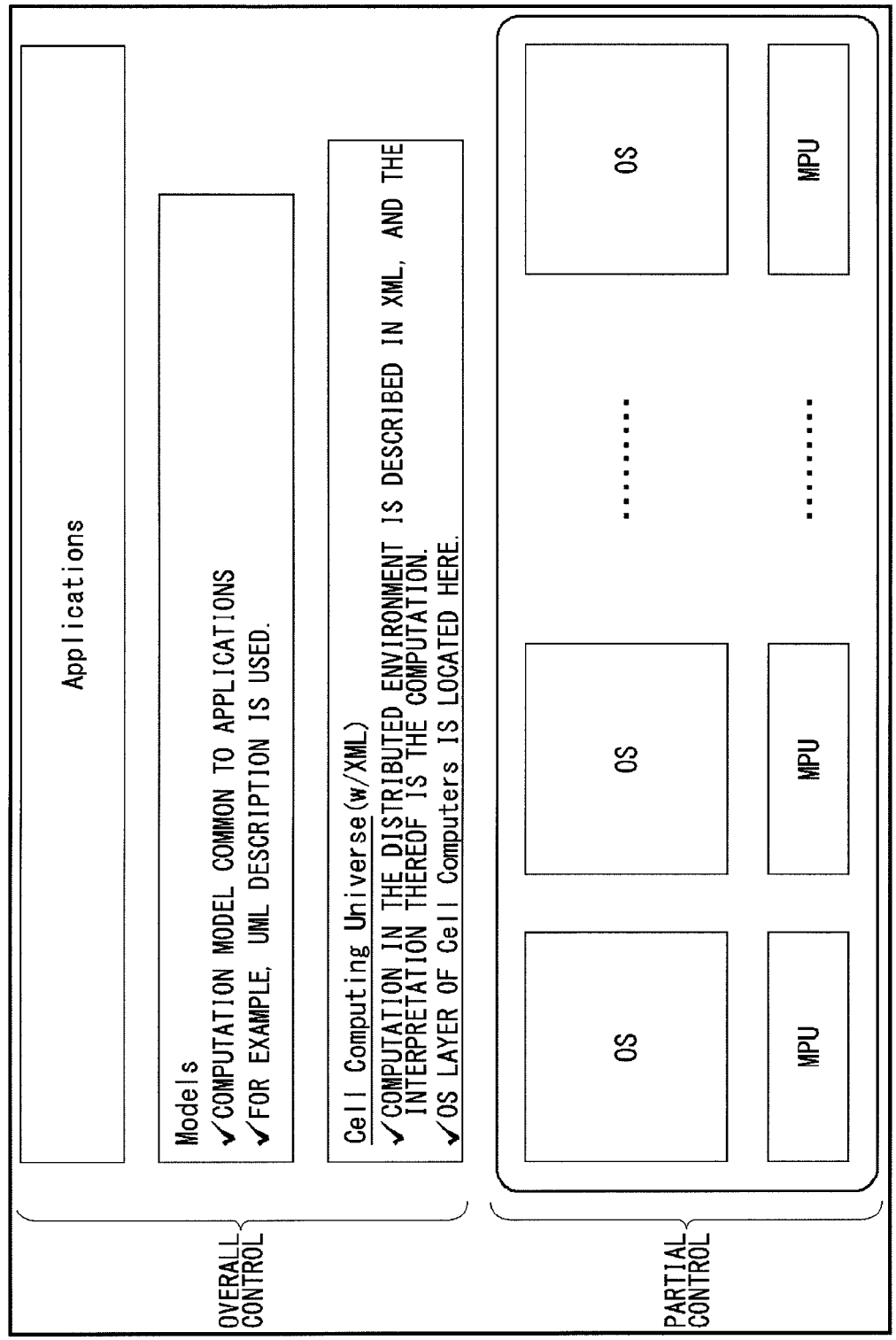
FIG. 4 schematically shows a hierarchal structure of a distributed processing according to an embodiment of the present invention.

FIG. 4 schematically shows a hierarchal structure of a distributed processing according to an embodiment of the present invention.

"Models" in the figure represents a basic computation model for writing the application code. For example, in the "Models", the unit of processing available to a lot of applications is defined, like the above-described <component>. The writer of the application code designs the whole process in compliance with the functions and rules provided by the "Models", while giving a necessary parameter by use of an attribute value. Consequently, since various unit programs already installed are automatically segmented and distributed by the MPU 22 according to the "Models", the application code writer is able to produce the content of processing, without considering which MPU 22 or which SPU 30 is going to be a processing entity that operates the process of the application code.

In the figure, the part indicated by "overall control" is a layer corresponding to the application itself. To put in other words, this layer defines the content of processing, whereas the layer indicated by "partial control" actually performs the processing. A group of the MPUs 22 and a group of SPUs 30 depicted in "partial control" layer are the processing entities that execute the application code defined in the "overall control" layer.

Figure 5:
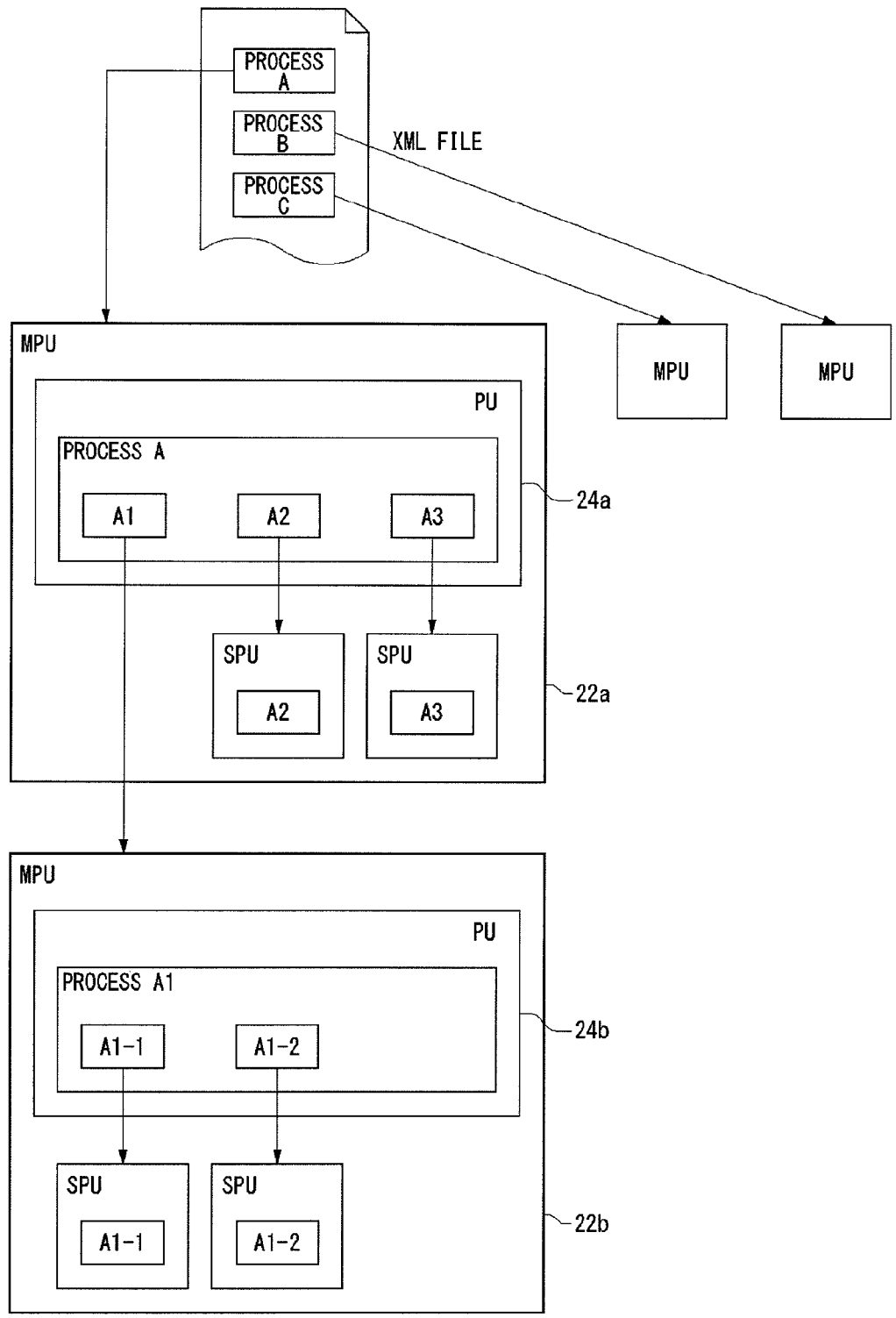
FIG. 5 schematically shows how the process written in an application code is distributed to plural processing entities.

FIG. 5 schematically shows how the process written in an application code is distributed to plural processing entities.

It is assumed for brevity that the application code is written in an XML file such that three processes including a process A, a process B, and a process C are executed in parallel. The main program dispatches the process A to an MPU 22a. A PU 24a of the MPU 22a loads a unit program for performing the process A into the main memory 42 of the MPU 22a. It is also assumed that the afore-mentioned unit program executes three processes including a process A1, a process A2, and a process A3 in parallel.

Then, the PU 24a distributes the three processes to the SPUs 30 under the control thereof. It is assumed that the process A2 and the process A3 can be performed by one SPU 30, respectively. So, the PU 24a assigns the process A2 and the process A3 to the SPUs 30 under the control thereof. The SPU 30 executes the element program corresponding to the assigned process.

It is assumed that the process A1 is accomplished by performing the parallel processing of two types of processes including a process A1-1 and a process A1-2. In this process, the PU 24a may distribute the process A1 to the SPU 30 under the control thereof, but may transfer the process A1 to another MPU 22b. The PU 24b of the MPU 22b loads the program for operating the process A1 into the main memory 42. The PU 42b may receive this program from the MPU 22a, or may acquire the program from another unit. The PU 24b assigns the process A1-1 and the process A1-2 to the SPUs 30 under the control thereof.

Figure 6:
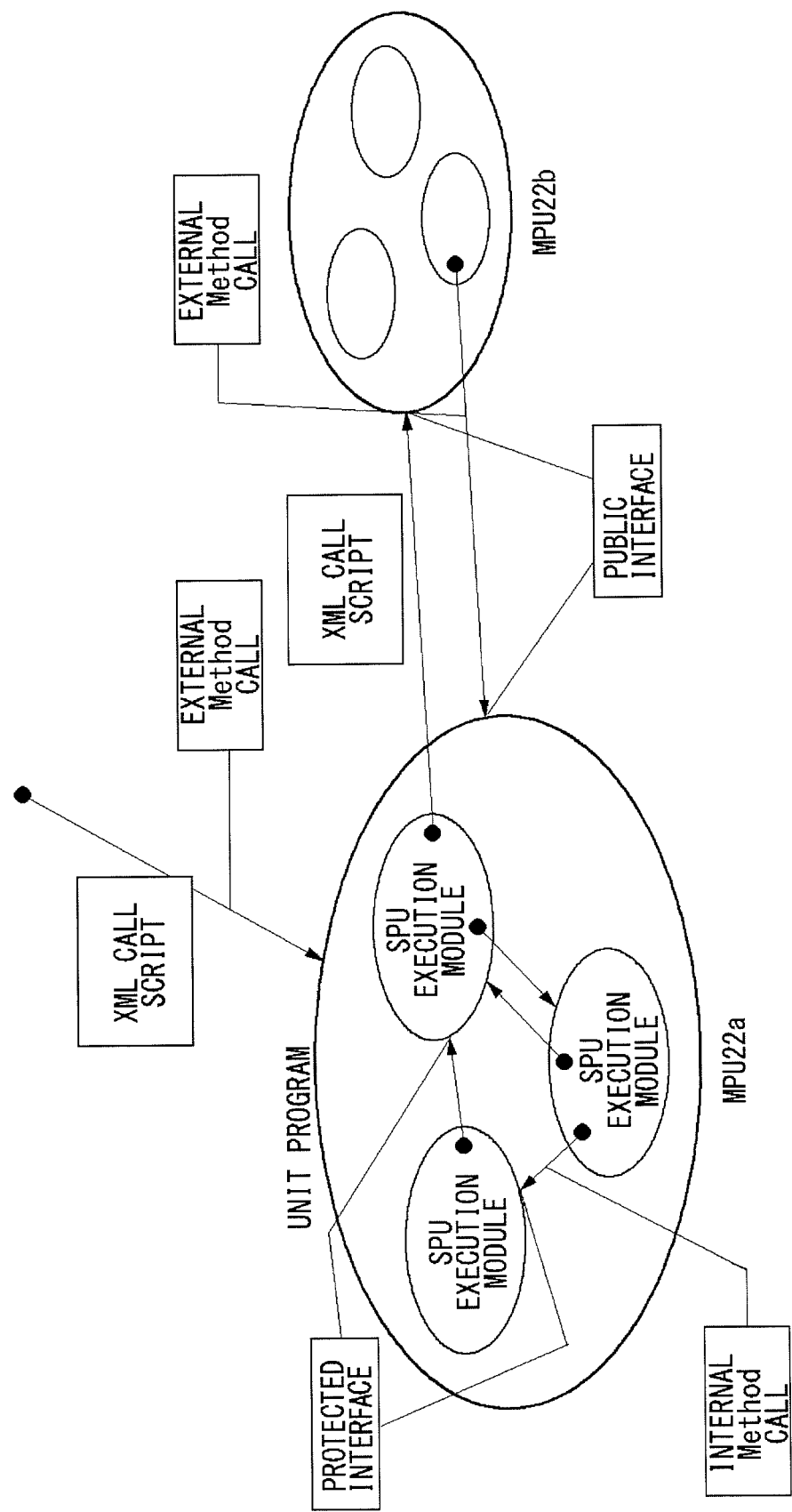
FIG. 6 schematically shows an interface for linking the processes between element programs.

FIG. 6 schematically shows an interface for linking the processes between the element programs.

The process written in the application code is segmented into plural unit programs. Then, the PU 24 of the MPU 22 assigns the element programs constituting the unit program to the SPUs 30, respectively.

The element programs executed by the SPUs 30 are capable of sending data to and receiving data from each other. For example, it is assumed that the element program of the SPU 30a is subject to conditional control in accordance with the processing state of the element program executed by the SPU 30b. Therefore, the element program of the SPU 30a needs to make an inquiry to the element program of the SPU 30b about the processing state. For this reason, the element program offers an interface as a method so that an external source can access the processing thereof.

The interface can be categorized into "Protected interface" and "Public interface". The SPUs 30 belonging to the identical MPU 22 basically perform the processes respectively assigned thereto, as different threads in an identical process space. "Protected interface" is an interface provided for communication between threads of the element programs of the afore-mentioned SPUs 30. Meanwhile, the SPUs 30 belonging to different MPUs 22 respectively belong to different process spaces. "Public interface" is an interface provided for communication between the processes of the element programs of the afore-mentioned SPUs 30. Such interfaces enable linkage operation between plural element programs.

For the protected interface, communication is initiated by message passing in the form of a method call. As in the case of the public interface, the process can be assigned to the SPU 30 belonging to another MPU 22, by sending a request in an XML format.

FIG. 7 shows an example of the element program.

"MyModule1" class is an instantiated class in a given SPU 30, and inherits "SpuModule" class. "SpuModule" class is provided with a fundamental function to be offered as an element program. The "MyModule1" class is the element program to be executed on the SPU 30. The method "method1" with an access authority designated as "PUBLIC" is a protected interface, whereas the method "method2" with an access authority designated as "PROTECTED" is a public interface.

The method2 function of MyModule1 class performs the process, while utilizing the interface of the element program being executed on another SPU 30. The method2 function firstly obtains a proxy object of MyModule2 class. MyModule2 class is a class instantiated by another SPU 30 belonging to the identical MPU 22. The class inherited from SpuModule class, like MyModule1 class or MyModule2 class, generates a proxy code for accessing the object thereof in the instantiation. The above proxy code is retained in the main memory 42, and the execution of the proxy code is controlled by the PU 24.

The PU 24 performs centralized control of what element program is being executed by means of the SPU 30 under the control thereof. Therefore, the method2 function of MyModule1 class is capable of acquiring a proxy object for accessing MyModule2 class by means of getModuleProxy function offered by an execution program on the PU 24. The method2 function is capable of calling a method such as asyncmethod, syncmethod, or delayedmethod offered by MyModule2 class by way of so acquired proxy object m2proxy. In this regard, asyncmethod is an asynchronous call, syncmethod is a synchronous call, and delayedmethod is a call for delay evaluation.

FIG. 8 shows the element program continued from FIG. 7.

The method3 function obtains a proxy object progproxy for accessing a unit program named MyProgram. For example, the public interface that can be accessed from another MPU 22 like the method1 of FIG. 7 is posted to another MPU 22 by the PU 24. The MPUs 22 are capable of exchanging such information on the public interface with each other. The information on the public interface may be managed by a given user terminal 16 in an integrated fashion, or may be managed by exchanging the information between the user terminals 16. In the case of the example of FIG. 5, the MPU 22a that executes the process A posts to another MPU 22 the information on the public interface of each element program included in the unit program, when converting the unit program corresponding to the process A into an executable format. Accordingly, the method3 function of MyModule1 class is capable of acquiring the proxy object for accessing another unit program named MyProgram, by making an inquiry to the PU 24 managing the SPU 30. Thus acquired proxy object progproxy allows calling the method named asyncmethod that is a public interface of MyProgram.

In addition, the method3 designates an XML file named "ScriptA" to perform the executeScript function. The logic for performing a given process is written in the XML file named "ScriptA". Such XML file is referred to as "interface code". The element program can be made compact in size by integrating typical processes executed between plural element programs as an interface code. The interface code may be managed in an integrated fashion by a given user terminal 16 as in the case of the information on the public interface, or the information thereof may be exchanged between the user terminals 16.

FIG. 9 shows the interface code.

In this interface code, the execution instruction of the method1, which is a public interface of the unit program named MyProgram, is given with two arguments including argument1 and argument2. The execution instruction of the method2 is given with no arguments. <concurrent> tag means that the execution instruction of executing the above functions concurrently and in parallel can be given. In addition, an instruction is given to the method3 and method4 by <sequence> tag such that the method3 is executed and then the method4 is executed. The execution of the executeScript function of FIG. 8 initiates the process written in the above interface code, thereby allowing controlling the process of another element program from SpuModule1, as a result.

The interface code or the application code is written in a given tag set defined by Models of FIG. 4.

In view of the foregoing description, an application of performing the simulation calculation of the movement of fish in an aquarium will be described as a program example of distributing the processing to plural MPUs 22 and further distributing to plural SPUs 30.

FIG. 10 schematically shows how the movement of fish is simulated by computer graphics.

The simulation is assumed in such a manner that seven fish including fish 52a through fish 52g is swimming in an aquarium 50 in accordance with a given pattern. The aquarium 50 is divided into four boxes including a box A through a box D, and is then processed. The SPU 30a calculates the movement of the fish in the box A. Likewise, the SPU 30b calculates the movement of the fish in the box B, the SPU 30c calculates the movement of the fish in the box C, and the SPU 30d calculates the movement of the fish in the box D. The SPU 30e moves a light source 54 provided outside the aquarium 50. It is assumed that the fish 52 changes the movement thereof when exposed to light from the light source 54.

Figure 11:
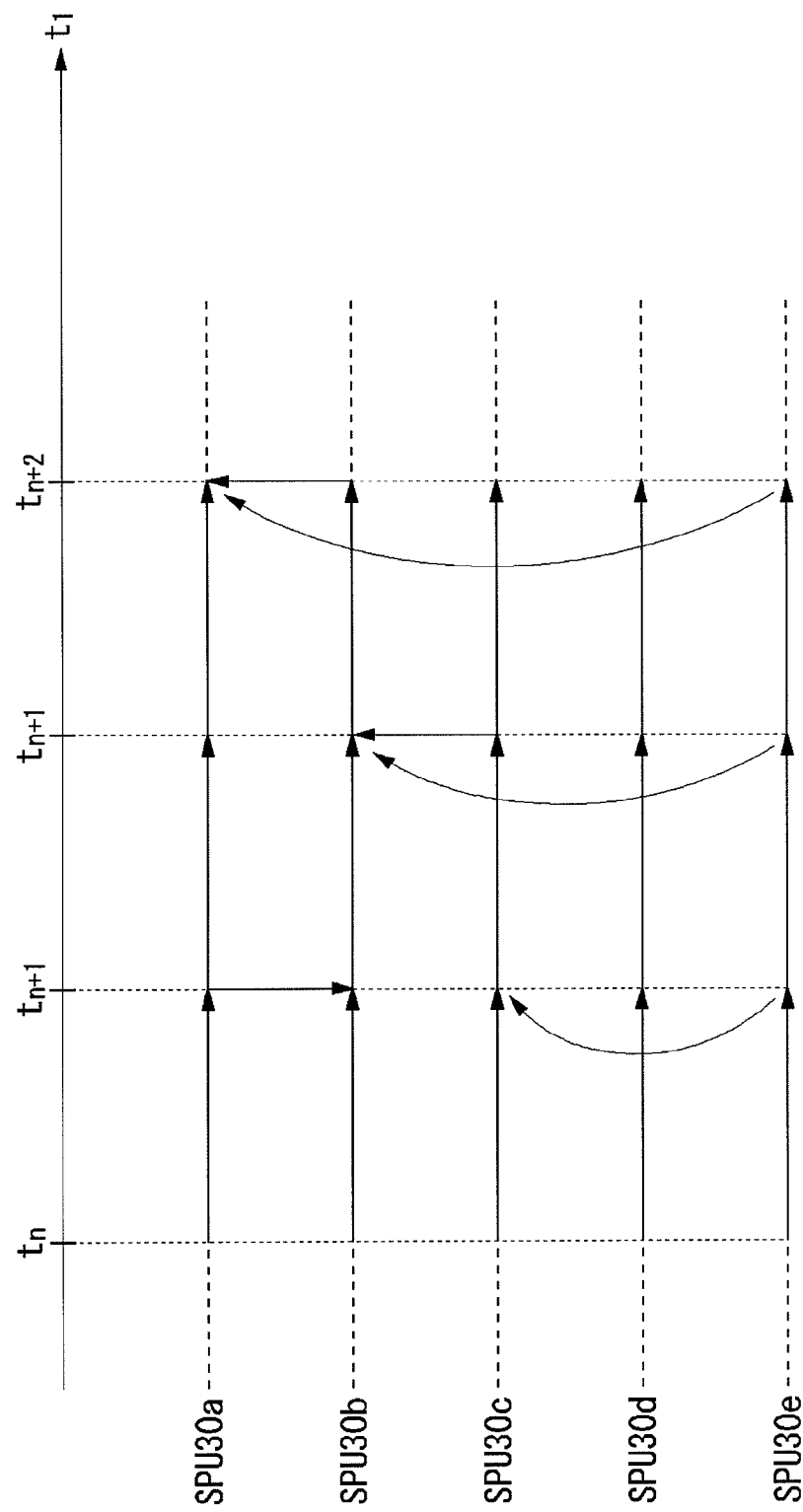
FIG. 11 shows a time chart explaining the linkage of the process between SPUs.

FIG. 11 shows a time chart explaining the linkage of the processes between the SPUs 30.

The five SPUs including the SPU 30a through the SPU 30e execute the respectively assigned element programs concurrently and in parallel. In the period from a time $t_o$ to a time $t_{n+1}$, the SPU 30a calculates the movement of the fish 52g in the box A. Likewise, the SPU 30b calculates the movement of the fish 52f and that of the fish 52e in the box B.

It is assumed that, as a result of the calculation made by the SPU 30a, the fish 52g in the box A moved to the box B. At this time, the SPU 30a communicates at the time $t_{n+1}$ that the fish 52g moved to the box B, by means of a method of the element program being executed by the SPU 30b. The SPU 30b is going to calculate the movement of all the fish 52 including the fish 52g that newly entered the box B, in a period from the time $t_{n+1}$ to a time $t_{n+2}$.

Meanwhile, it is assumed that after the SPU 30e causes the light source 54 to move in the period from the time $t_n$ to the time $t_{n+1}$, there is an influence on the movement of the fish in the box C calculated by the SPU 30c. At this time, the element program executed by the SPU 30e communicates that the box C was exposed to light by means of a method of the element program being executed by the SPU 30c. With this, the SPU 30c calculates the movement of the fish 52 in the period from the time $t_{n+1}$ to the time $t_{n+2}$ in consideration of the influence of the light source.

FIG. 12A and FIG. 12B show an example of a program used by the present simulation. In this program example, an initial arrangement process (part A surrounded by a dashed-dotted line) and a simulation execution process (part B surrounded by a dashed-dotted line) are sequentially performed. <Sequence> tag in the figure means sequential processing of the following processes, that is, the initial arrangement process A and the simulation execution process B.

In the initial arrangement process A, the box A through the box D in FIG. 10 and the simulation process relating to the light source 54 are assigned to the SPU 30a through the SPU 30e, and then the initialization for executing the assigned simulations are respectively performed on the SPUs 30 in parallel. <Concurrent> tag in the figure means that each of the processes indicated by Aa through Al is to be executed in parallel.

In this example, modules Aa through Ad, surrounded by dashed lines, corresponding to the initial arrangement of the aquarium 50 are respectively assigned to the SPUs 30a through 30e, and a module A1, surrounded by a dashed line, corresponding to the initial arrangement of the light source 54 is assigned to the SPU 30e. At the time of initialization, each of the SPUs 30 receives various types of values necessary for performing the simulation, such as the ID of a program for simulating the box assigned thereto and that for simulating an adjacent box.

In the simulation execution process B, a simulation module B1 for moving the light source is executed on the SPU 30e. Simulation modules Ba through Bd in the boxes are respectively executed in parallel on the SPU 30a through 30d on the basis of the simulation result of the light source. This series of processes are repeatedly performed by the instruction of <Loop> tag.

In this program example, the content thereof is analyzed by a given routine of the main program and is broken into modules, and then each module is assigned to the SPU 30 available to each module. The main program is executed on one of the MPUs 22. When the number of the program modules to be executed in parallel is greater than that of the SPUs 30 available, the SPUs 30 may be used in a time-sharing manner. Alternatively, the main program may distribute the program modules to the SPUs 30, with reference to degree of coupling between the SPUs 30 or the priority of the program module.

With the above-described configuration, the simulation of calculating the movements of plural fish 52 in the aquarium 50 is accomplished by concurrent and parallel processing by five SPUs 30. In such case, a simple application code enables distributing a complex processing into plural calculation resources with ease.

In accordance with the above processing method, the content of the process written in a structured document file such as an XML file is distributed to plural PUs 24, and is further distributed to plural SPUs 30. This allows the provision of a scheme suitable for distributing the processing to plural calculation resources, while reducing the load of writing the application code. If plural MPUs 22 are available, processes are respectively distributed to the MPUs 22. If only a single MPU 22 is available, the processes may be executed in a time-sharing manner.

Each of the PUs 24 breaks the process into unit programs or element programs, registers the interface of each program, assigns each program, controls the execution, and resisters and searches for the processing entity of each program, in cooperation with each other. Therefore, a group of the PUs 24 of the MPU 22 perform the distributed processing in cooperation with each other, so that the SPUs 30 respectively under the control of the MPUs 22 actually perform the processes.

The function of a process breaking unit and that of a distributor, recited in the scope of claims, are accomplished by a given routine of the main program executed on any of the MPUs 22, according to the present embodiment. The MPU 22 that provides the functionality of the process breaking unit and that of the distributor may be an arbitrary MPU 22 mounted in an apparatus included in the resource management system 10, or may be mounted in an apparatus dedicated for executing the main program.

It should be understood by those skilled in the art that the function implemented by each of the constituting elements recited in the scope of claims is achieved by a single unit in the functional block described according to an embodiment of the present invention or cooperation thereof.

The description of the invention given above is based upon an embodiment. The embodiment is illustrative in nature and various variations in constituting elements and processes involved are possible. Those skilled in the art would readily appreciate that such variations are also within the scope of the present invention.

INDUSTRIAL APPLICABILITY

The present invention is applicable to distributed processing computing.

The invention claimed is:

1. A data processing system adapted to distribute a process to a plurality of control units coupled to each other via a communication line to execute a computer program, comprising:
a process breaking unit, which refers to a script code in which a data process is written that designates simulation tasks related to a plurality of simulation areas, each simulation area being influenced by one another, and which breaks the data process into a plurality of units of processing; and
a distributor, which assigns the units of processing to the plurality of the control units, respectively,
wherein each of the control units comprises:
a main controller, which controls, in an integrated manner, the control unit in which the main controller is contained; and
a plurality of sub-controllers, which execute tasks assigned by the main controller,
wherein a first main controller of a first control unit divides a unit of processing as tasks and distributes the tasks to a plurality of first sub-controllers under control of the first main controller in accordance with an execution state of each of the first sub-controllers, and each of the first sub-controllers executes the respective tasks,
wherein the first main controller is configured to issue a request to a second main controller of a second control unit to distribute the tasks to a plurality of second sub-controllers under control of the second main controller, without the first main controller designating which of the second sub-controllers will execute the tasks,
wherein the second main controller distributes the tasks, respectively, to the second sub-controllers in accordance with the execution state of each of the second sub-controllers, and each of the second sub-controllers executes the respective tasks,
wherein the plurality of sub-controllers executes the simulation tasks related to the plurality of simulation areas in parallel so as to allow the script code to be executed,
wherein the first main controller is notified through a communication interface for controlling simulation from a different simulation task of a simulation task distributed to a given sub-controller, and a sub-controller different from the given sub-controller is allowed control of the simulation task executed by the given sub-controller via the communication interface, and
wherein, when a first simulation task related to a first simulation area affects a second simulation task related to a second simulation area among the plurality of simulation areas, a first one of the sub-controllers executing the first simulation task related to the first simulation area notifies a second sub-controller executing the second simulation task of a processing result of the first simulation task related to the first simulation area, via the communication interface of which the main controller was notified, thereby allowing the second one of the sub-controllers to execute the second simulation task affected by the first simulation task.

2. The data processing system according to claim 1, wherein the first main controller is configured to assign to a plurality of other main controllers the tasks of the unit of processing to sub-controllers under the control of the plurality of other main controllers, respectively.

3. The data processing system according to claim 1, wherein the script code is written as a structured document file by use of a given tag set.

4. The data processing system according to claim 1,
wherein a public communication interface is formed between the plurality of control units to enable one sub-controller contained in one control unit to be configured to have access to a task that is performed by a separate sub-controller contained in a separate control unit among the control units, and
wherein public communication interface information is retained regarding which tasks are given to which respective sub-controllers among the plurality of control units.

5. The data processing system according to claim 4,
wherein an interface code is retained with the public communication interface information for the plurality of control units, the interface code including instructions for a unit of processing assigned to one control unit to have access to a separate unit of processing assigned to a separate control unit.

6. The data processing system according to claim 1,
wherein, if the division of a unit of processing results in tasks to be executed in parallel that are greater in number than that of available sub-controllers, the main controller assigns tasks to the available sub-controllers to be processed in a time-sharing manner.

\* \* \* \* \*